US006399002B1

(12) United States Patent
Lupke et al.

(10) Patent No.: US 6,399,002 B1
(45) Date of Patent: Jun. 4, 2002

(54) METHOD OF MAKING A PIPE WITH COUPLING CONFORMING TO PIPE DIAMETER

(76) Inventors: Manfred A. A. Lupke, 92 Elgin Street, Thornhill, Ontario (CA), L3T 1W6; Stefan A. Lupke, 32 Vintage Lane, Thornhill, Ontario (CA), L3T 1X6

( * ) Notice: Subject to any disclaimer, the term of this patent is extended or adjusted under 35 U.S.C. 154(b) by 0 days.

(21) Appl. No.: 09/197,435

(22) Filed: Nov. 23, 1998

(51) Int. Cl.[7] .......................... B29C 47/06; F16L 11/12
(52) U.S. Cl. ...................... 264/139; 264/150; 264/152; 264/167; 264/172.1; 264/173.17; 264/508; 264/515; 156/244.13; 156/244.15; 138/109; 138/121; 285/399
(58) Field of Search ........................ 285/399; 138/121, 138/109, 122; 264/152, 139, 167, 150, 145, 508, 514, 515, 172.1, 173.17, 209.1; 156/244.13, 244.15

(56) References Cited

U.S. PATENT DOCUMENTS

| | | | |
|---|---|---|---|
| 3,926,222 A | | 12/1975 | Shroy et al. |
| 4,082,327 A | * | 4/1978 | Sting et al. .................. 285/401 |
| 4,240,470 A | * | 12/1980 | McPherson et al. ........ 138/109 |
| 4,377,545 A | * | 3/1983 | Hornbeck ................... 264/167 |
| 4,534,923 A | * | 8/1985 | Lupke ......................... 264/156 |
| 4,779,651 A | * | 10/1988 | Hegler et al. ................ 138/109 |
| 4,865,797 A | * | 9/1989 | Jarvenkyla ................... 264/508 |
| 4,913,473 A | * | 4/1990 | Bonnema et al. ........... 285/423 |
| 5,071,173 A | | 12/1991 | Hegler |
| 5,335,945 A | * | 8/1994 | Meyers ........................ 285/236 |
| 5,405,569 A | * | 4/1995 | Lupke ......................... 264/504 |
| 5,429,398 A | | 7/1995 | Lupke |
| 5,704,401 A | * | 1/1998 | Fukui et al. ................. 138/121 |
| 5,996,635 A | * | 12/1999 | Hegler ........................ 138/109 |

FOREIGN PATENT DOCUMENTS

EP             0385465             9/1990

\* cited by examiner

*Primary Examiner*—Jan H. Silbaugh
*Assistant Examiner*—Stefan Staicovici

(57) ABSTRACT

A plastic pipe has a multiple layer wall construction including major and minor wall portions. The major wall portions are formed with first corrugations and are separated from one another by the minor wall portions which are formed with second corrugations and a bowed wall part which is of the same diameter as the first corrugations. The second corrugations are smaller in diameter than both the first corrugations and the bowed wall pipe. The wall construction is cut at the bowed wall part to produce two pipe sections which couple with one another. One of those pipe sections has an open ended bell converted from the bowed wall pipe and the other pipe section has a male spigot formed by the second corrugations of the wall construction.

5 Claims, 3 Drawing Sheets

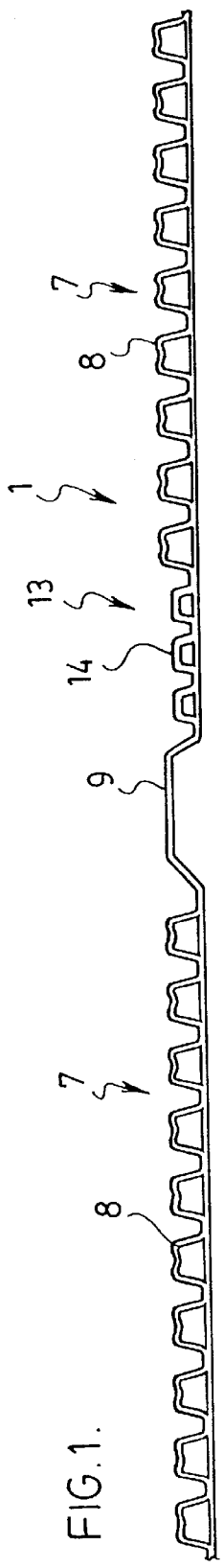
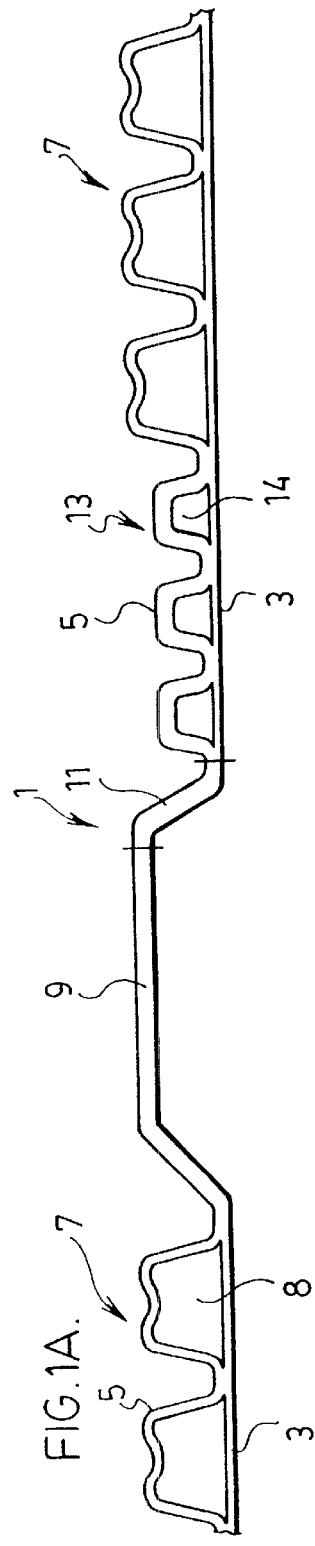
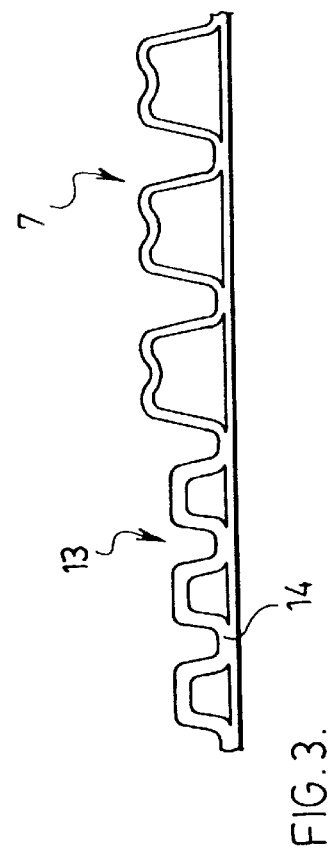
FIG. 1.
FIG. 1A.
FIG. 2.
FIG. 3.

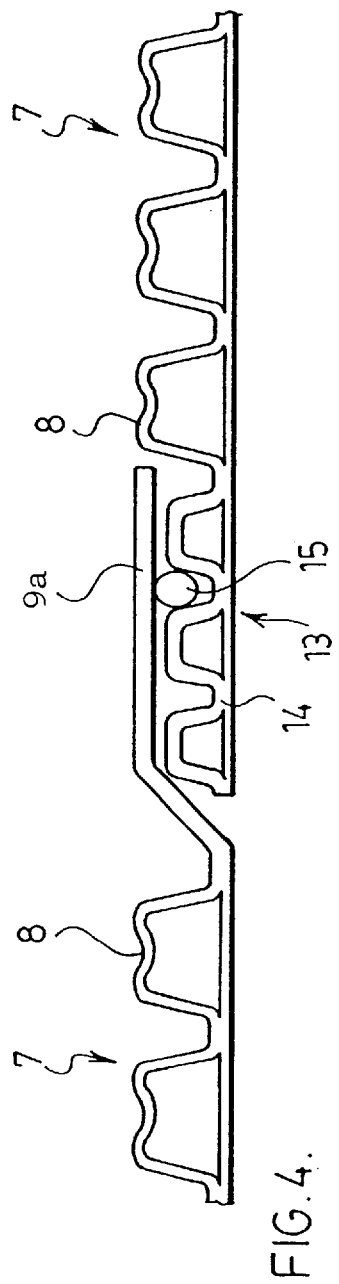
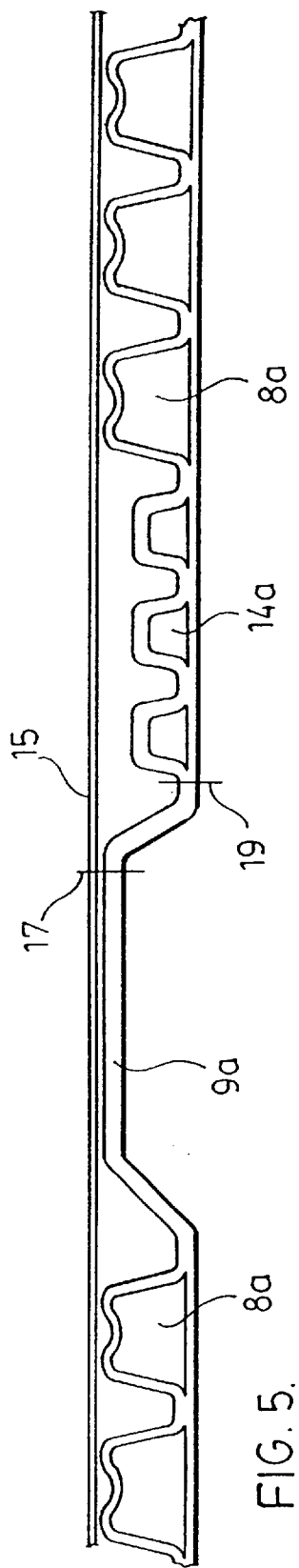
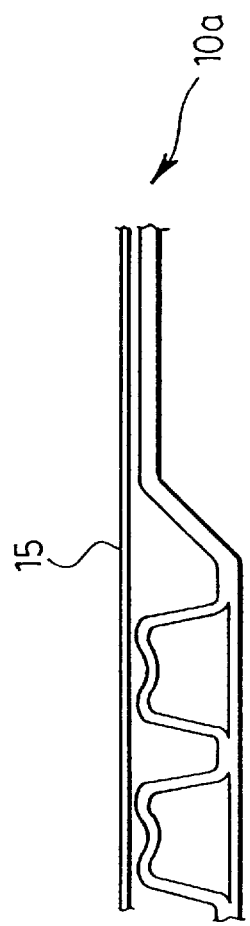
FIG. 4.
FIG. 5.
FIG. 6.

METHOD OF MAKING A PIPE WITH COUPLING CONFORMING TO PIPE DIAMETER

FIELD OF THE INVENTION

The present invention relates to the making of couplers in plastic pipes.

BACKGROUND OF THE INVENTION

Plastic pipes are built with belled ends for coupling with other pipes. Conventionally, these belled ends are of a larger diameter than the remainder of the pipe. This presents a problem with respect to shipping and storage of the pipes because spacers are needed between the pipes. Without these spacers, the enlarged coupling bell of each pipe is exposed to the weight of all of the pipes around it. This can easily cause damage to the bells by weakening, deforming and even cracking of the bells making them ineffective in providing a sealed coupling between the pipes.

SUMMARY OF THE PRESENT INVENTION

The present invention relates to a plastic pipe from which pipe sections having male and female coupling ends are made. According to the present invention, the female coupling end, i.e. the coupling bell is consistent in diameter with the main body of the pipe. As such, when the pipe is loaded with other similar pipes without using spacers between the pipes most of the load is taken up by the pipe body rather than the coupling bell of the pipe.

In particular, a plastic pipe made in accordance with the present invention has a multiple layer wall construction comprising major wall portions which are formed with first corrugations. These major wall portions are separated from one another by minor wall portions formed with second corrugations and also formed with a bowed wall part. The second corrugations are smaller in diameter than both the first corrugations and the bowed wall part. The bowed wall part is consistent in diameter with the first corrugations.

A plastic pipe made with the above wall construction is used for forming coupleable pipe sections. This is achieved by removing a transition piece of the bowed wall part to the second corrugations. This produces a first pipe section having a coupling bell converted from the bowed wall part and a second pipe section having a male spigot formed by the second corrugations of the pipe. The male spigot fits into the bell for coupling the two pipe sections with one another.

BRIEF DESCRIPTION OF THE DRAWINGS

The above as well as other advantages and features of the present invention will be described in greater detail according to the preferred embodiments of the present invention in which;

FIG. 1 is a sectional view through a pipe wall construction according to a preferred embodiment of the present invention;

FIG. 1A shows an enlargement of part of the pipe wall construction of FIG. 1;

FIGS. 2 through 4 show various stages of preparing the pipe wall construction of FIG. 1 to produce coupled pipe sections;

FIG. 5 is a sectional view through a pipe wall construction according to a further preferred embodiment of the present invention;

FIGS. 6 through 9 show the different method steps of preparing the pipe wall construction of FIG. 5 to produce coupled pipe section.

Figure 7:
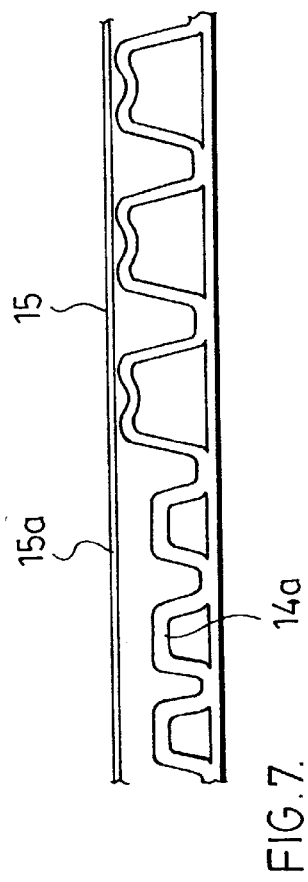

DETAILED DESCRIPTION ACCORDING TO THE PREFERRED EMBODIMENTS OF THE PRESENT INVENTION IN WHICH

FIG. 1 shows a pipe wall construction generally indicated at 1. This pipe wall construction is formed from a common source of plastic separated into different streams through an extrusion process as is known in the art. However, unlike conventional practice these two streams of plastic are brought together to form the unique configuration of the pipe wall construction of FIG. 1.

More specifically, and as better seen in FIG. 1A the wall construction comprises an inner pipe wall 3 formed from the first stream of plastic and an outer pipe wall 5 formed from the second stream of plastic. The inner pipe wall is flat except where the pipe wall is formed with a bowed wall part 9. The outer pipe wall is formed with a series of corrugations except at the bowed wall part 9 where the inner and outer pipe walls conform with one another.

As noted above, the outer pipe wall is formed into corrugations. However, these corrugations vary in diameter lengthwise of the pipe. Specifically, along major portions 7 of the length of the pipe, the outer wall is formed into corrugations 8 and along minor portions 13 of the length of the pipe, the outer wall is formed into corrugations 14. These minor portions 13 of the pipe wall also include the bowed wall part 9.

FIG. 1 best shows how the major portions 7 provided with corrugations 8 dominate the length of the pipe relative to the intervening minor pipe wall portions 13 comprising bowed wall part 9 and corrugations 14.

In FIG. 1A it will be seen that although corrugations 8 have a larger diameter than the corrugations 14, the corrugations 14 have a greater wall thickness. This is because both corrugations are made with the same amount of plastic material.

Bowed wall part 9 has a transition area 11 where it meets with the small diameter corrugations 14. The removal of this transition area produces two separate pipe sections having end wall constructions as shown in FIGS. 2 and 3. The wall construction of FIG. 2 terminates in a bell 9a which has been converted from the bowed wall part 9 through the removal of the transition area 11 of the bowed wall part. This transition region removal also produces a male spigot end wall construction as shown in FIG. 3 where the spigot is formed by the small diameter corrugations 14. FIG. 4 of the drawings shows that a seal 15 is placed into one of the valleys of the corrugations 14. The bell 9a of the pipe wall section of FIG. 2 is then slid over the spigot forming corrugations 14 of the pipe wall end of FIG. 3. This produces a sealed coupling of the two pipe ends relative to one another. The increased wall thickness of the spigot forming corrugations makes them strong to maintain the seal in the coupling.

FIG. 4 clearly shows that the bell 9a is of a height or diameter consistent with that of the corrugations 8. This produces two benefits. Firstly, the bell on the pipe does not protrude outwardly relative to the major portions of the pipe wall and as such is not subject to localized pressure which would be experienced by larger bells on conventional pipes during shipping and storage. As such, the bell 9a maintains its circular configuration around the pipe and is very effective in providing a sealed pipe coupling.

Secondly, the coupled regions of joined pipe sections are of a consistent diameter with the rest of the pipe. This is important for a number of reasons such as for example the feeding of the pipe into relatively tight spaces. In such a situation the size of the opening is not dictated by an enlarged coupling as is the case in prior art constructions.

Another benefit of making a pipe wall construction with first corrugations, second smaller diameter corrugations and a bowed wall part consistent in diameter with the first corrugations, is that such a wall construction can be used to make a triple wall pipe as shown in FIG. 5 of the drawings.

The triple wall pipe is in its first stages of formation made in exactly the same manner as the double wall pipe of FIG. 1, i.e. two streams of plastic are extruded with one another to form a pipe wall having major pipe wall portions formed with corrugations 8a and separated by minor pipe wall portions comprising corrugations 14a and a bowed wall part 9a. Corrugations 14a are again smaller in diameter than but of increased wall thickness relative to corrugations 8a.

After the two streams of plastic have been formed into a double wall pipe as described immediately above, it is fitted within a plastic sheath or layer 15. This sheath is only very slightly greater in diameter than the corrugations 8a and the bowed wall part 9a. The sheath as shown is however substantially greater in diameter than the corrugations 14a.

The outer sheath is preferably applied by a cross head and the entire pipe comprising all three layers is put through a vacuum sizing tank. This sets the outside shim of the sheath where it attaches to the corrugations 8a and the bowed wall part 9a. The sheath and the corrugations 14a do not attach to one another as shown in FIG. 5.

The triple wall pipe has a transition area defined by the lines 17 and 19 in FIG. 5. By removing this transition area, two separate pipe sections shown in FIGS. 6 and 7 are produced. The pipe section of FIG. 6 terminates with a belled end 10a which comprises the portion of the bowed wall part 9a remaining after the transition region has been removed and the sheath 15 covering that remaining bowed wall part.

Figure 8:
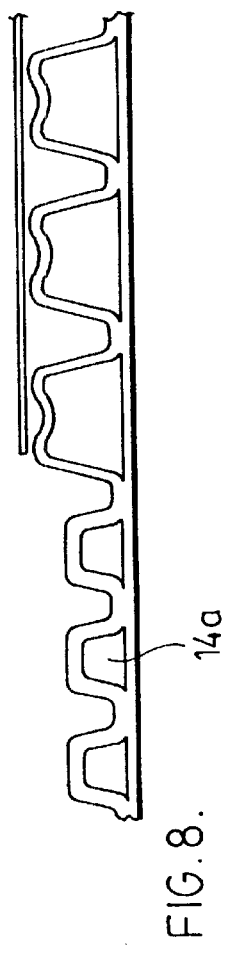

The end wall region of the pipe section shown in FIG. 7 comprises corrugations 14a and a sheath portion 15a spaced outwardly of the corrugations. FIG. 8 of the drawings shows that in preparing a male spigot coupler, sheath portion 15a is removed from the pipe end to uncover corrugations 14a.

Figure 9:
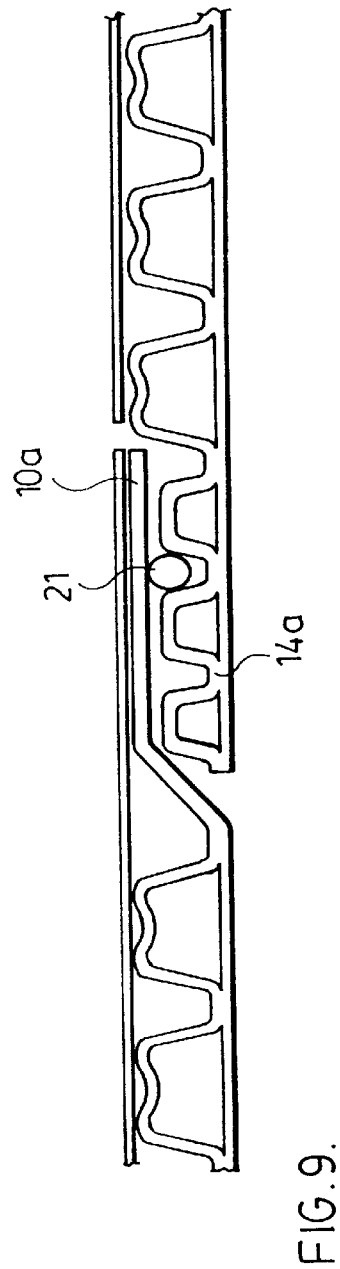

FIG. 9 of the drawings shows the coupling of the bell 10a with the spigot forming corrugations 14a. Prior to making this coupling, a flexible O-ring seal 21 is inserted into one of the valleys of the corrugations 14a to provide an effective seal for the coupling.

The description above relates to a female bell on one end of the pipe section and a male spigot on one end of the another pipe section. As will be appreciated, an individual pipe section according to the present invention has these male and female coupling parts at its opposite ends.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A method of extruding a plastic pipe having a pipe wall construction made from first and second streams of plastic, the first stream of plastic being formed into an interior part of the wall construction, the second stream of plastic being formed into a covering wall part over the interior wall part of the wall construction, the covering wall part being shaped into first and second corrugations with the interior wall part being flat where covered by the first and second corrugations, the wall construction further including a bowed wall region where the first and second steams of plastic are extruded lying against one another, the first corrugations and the bowed wall region being formed with consistent outside diameters and the second corrugations being formed with an outside diameter less than that of the first corrugations and the bowed wall region, the first corrugations, the bowed wall region and the second corrugations all being formed continuously along the pipe with the bowed wall region being located between the first corrugations and the second corrugations, the first corrugations comprising a major part of the pipe and the bowed wall region and the second corrugations comprising a minor part of the pipe.

2. A method as claimed in claim 1, characterized in that the bowed wall region is formed with a transitional wall part which reduces outside diameter of the pipe from the bowed wall region to the second corrugations.

3. A method as claimed in claim 2 characterized in that the transitional wall part is removed from the pipe to form first and second pipe sections in which the bowed wall region is converted to an open ended bell on the first pipe section and in which the second corrugations form a spigot on the second pipe section, the bell and the spigot being interfittable with one another for coupling the first and second pipe sections together with one another.

4. A method as claimed in claim 3 including covering the wall construction with an external layer of plastic by adhering the external layer of plastic to the first corrugations and the bowed wall region and not to the second corrugations.

5. A method as claimed in claim 4 including removing part of the external layer of plastic around the second corrugations to uncover the second corrugations to form the spigot on the second pipe section.

* * * * *

UNITED STATES PATENT AND TRADEMARK OFFICE
CERTIFICATE OF CORRECTION

| | | |
|---|---|---|
| PATENT NO. | : 6,399,002 B1 | Page 1 of 1 |
| APPLICATION NO. | : 09/197435 | |
| DATED | : June 4, 2002 | |
| INVENTOR(S) | : Manfred A. A. Lupke and Stefan A. Lupke | |

It is certified that error appears in the above-identified patent and that said Letters Patent is hereby corrected as shown below:

Column 4, lines 8-29, please replace Claim 1 with the following:

1. A method of extruding a plastic pipe having a pipe wall construction made from first and second streams of plastic, the first stream of plastic being formed into an interior part of the wall construction, the second stream of plastic being formed into a covering wall part over the interior wall part of the wall construction, the covering wall part being shaped into first and second corrugations with the interior wall part being flat where covered by the first and second corrugations, the wall construction further including a bowed wall region where the first and second [steams] streams of plastic are extruded lying against one another, the first corrugations and the bowed wall region being formed with consistent outside diameters and the second corrugations being formed with an outside diameter less than that of the first corrugations and the bowed wall region, the first corrugations, the bowed wall region and the second corrugations all being formed continuously along the pipe with the bowed wall region being located between the first corrugations and the second corrugations, the first corrugations comprising a major part of the pipe and the bowed wall region and the second corrugations comprising a minor part.

Signed and Sealed this

Twenty-fourth Day of November, 2009

David J. Kappos
*Director of the United States Patent and Trademark Office*

[(12)] EX PARTE REEXAMINATION CERTIFICATE (7958th)

United States Patent
Lupke et al.

[(10)] Number: US 6,399,002 C1
[(45)] Certificate Issued: Jan. 4, 2011

[(54)] METHOD OF MAKING A PIPE WITH COUPLING CONFORMING TO PIPE DIAMETER

[(76)] Inventors: Manfred A. A. Lupke, 92 Elgin Street, Thornhill, Ontario (CA), L3T 1W6;
Stefan A. Lupke, 32 Vintage Lane, Thornhill, Ontario (CA), L3T 1X6

Reexamination Request:
No. 90/010,530, May 7, 2009

Reexamination Certificate for:
Patent No.: 6,399,002
Issued: Jun. 4, 2002
Appl. No.: 09/197,435
Filed: Nov. 23, 1998

Certificate of Correction issued Nov. 24, 2009.

[(51)] Int. Cl.
*F16L 47/00* (2006.01)
*F16L 9/06* (2006.01)
*F16L 25/00* (2006.01)
*F16L 47/08* (2006.01)
*F24F 13/02* (2006.01)

[(52)] U.S. Cl. .................. 264/139; 138/109; 138/121; 156/244.13; 156/244.15; 264/150; 264/152; 264/167; 264/172.1; 264/173.17; 264/508; 264/515; 285/399

[(58)] Field of Classification Search ............. 264/139
See application file for complete search history.

[(56)] References Cited

U.S. PATENT DOCUMENTS

| 3,677,676 | A | 7/1972 | Hegler |
| 5,071,173 | A | 12/1991 | Hegler et al. |
| 5,320,797 | A | 6/1994 | Hegler et al. |
| 5,429,398 | A | 7/1995 | Lupke |

FOREIGN PATENT DOCUMENTS

WO WO 92/11485 7/1992

OTHER PUBLICATIONS

Corma, Inc., Corrugated Pipe and Lightweight Profile Pipe Systems, 1993 publication, (3 pgs).

*Primary Examiner*—Alan Diamond

[(57)] ABSTRACT

A plastic pipe has a multiple layer wall construction including major and minor wall portions. The major wall portions are formed with first corrugations and are separated from one another by the minor wall portions which are formed with second corrugations and a bowed wall part which is of the same diameter as the first corrugations. The second corrugations are smaller in diameter than both the first corrugations and the bowed wall pipe. The wall construction is cut at the bowed wall part to produce two pipe sections which couple with one another. One of those pipe sections has an open ended bell converted from the bowed wall pipe and the other pipe section has a male spigot formed by the second corrugations of the wall constructions.

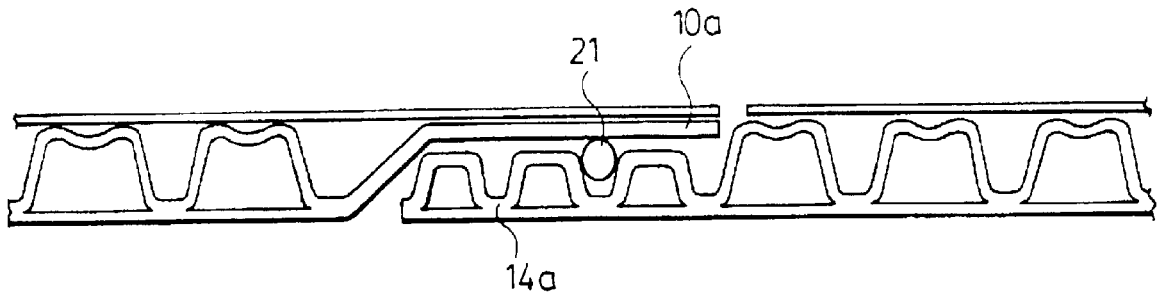

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4 and 5 is confirmed.

Claims 1-3 are cancelled.

New claims 6-8 are added and determined to be patentable.

6. *A method of extruding a plastic pipe having a pipe wall construction made from first and second streams of plastic, the first stream of plastic being formed into an interior part of the wall construction, the second stream of plastic being formed into a covering wall part over the interior wall part of the wall construction, the covering wall part being shaped into first and second corrugations with the interior wall part being flat where covered by the first and second corrugations, the wall construction further including a bowed wall region where the first and second streams of plastic are extruded lying against one another, the first corrugations and the bowed wall region being formed with consistent outside diameters and the second corrugations being formed with an outside diameter less than that of the first corrugations and the bowed wall region, the first corrugations, the bowed wall region and the second corrugations all being formed continuously along the pipe with the bowed wall region being located between the first corrugations and the second corrugations, the first corrugations comprising a major part of the pipe and the bowed wall region and the second corrugations comprising a minor part, and covering the pipe wall construction with an external layer of plastic by adhering the external layer of plastic to the first corrugations and the bowed wall region and not to the second corrugations.*

7. *A method as claimed in claim 6, wherein the bowed wall region is formed with a transitional wall part which reduces the outside diameter of the pipe from the bowed wall region to the second corrugations.*

8. *A method as claimed in claim 7, further comprising removing part of the external layer of plastic covering the second corrugations between the bowed wall region and the first corrugations to uncover the second corrugations, and*

*removing the transitional wall part from the pipe to form first and second pipe sections in which the bowed wall region is converted to an open ended bell on the first pipe section and in which the second corrugations form a spigot on the second pipe section, the bell and the spigot being interfittable with one another for coupling the first and second pipe sections together with one another.*

\* \* \* \* \*